(No Model.) 2 Sheets—Sheet 2.
W. S. & C. I. CORBY.
MACHINE FOR WORKING AND SHAPING DOUGH.
No. 590,133. Patented Sept. 14, 1897.
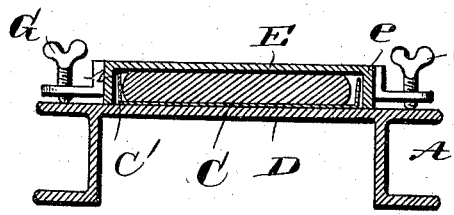
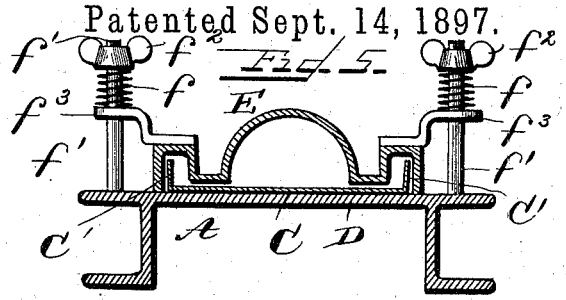
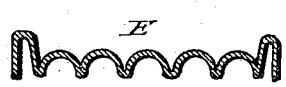
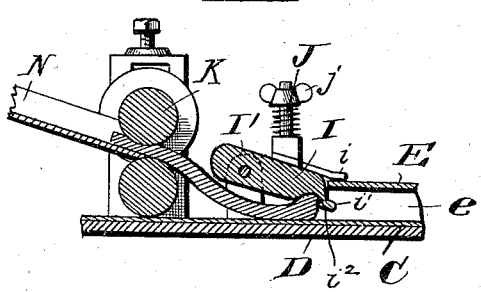
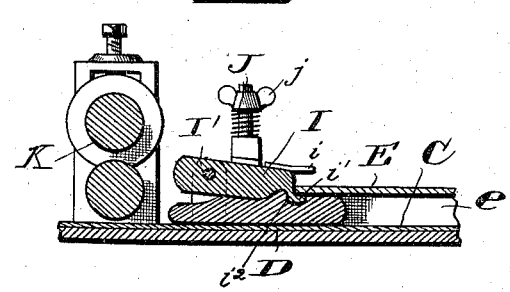
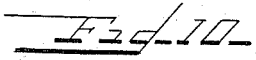
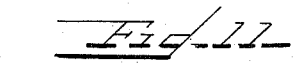
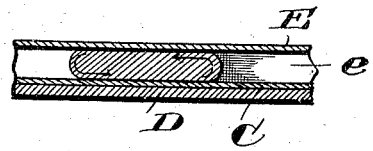
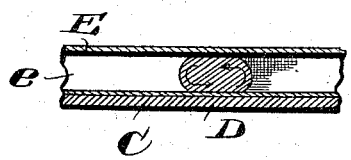
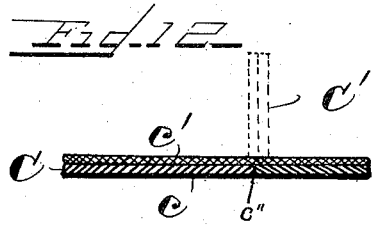
Witnesses
C. A. Barker
H. McFarnam
Inventors:
William S. Corby and
Charles I. Corby.
By J. S. Barker,
their Atty.
THE NORRIS PETERS CO., PHOTO-LITHO., WASHINGTON, D. C.

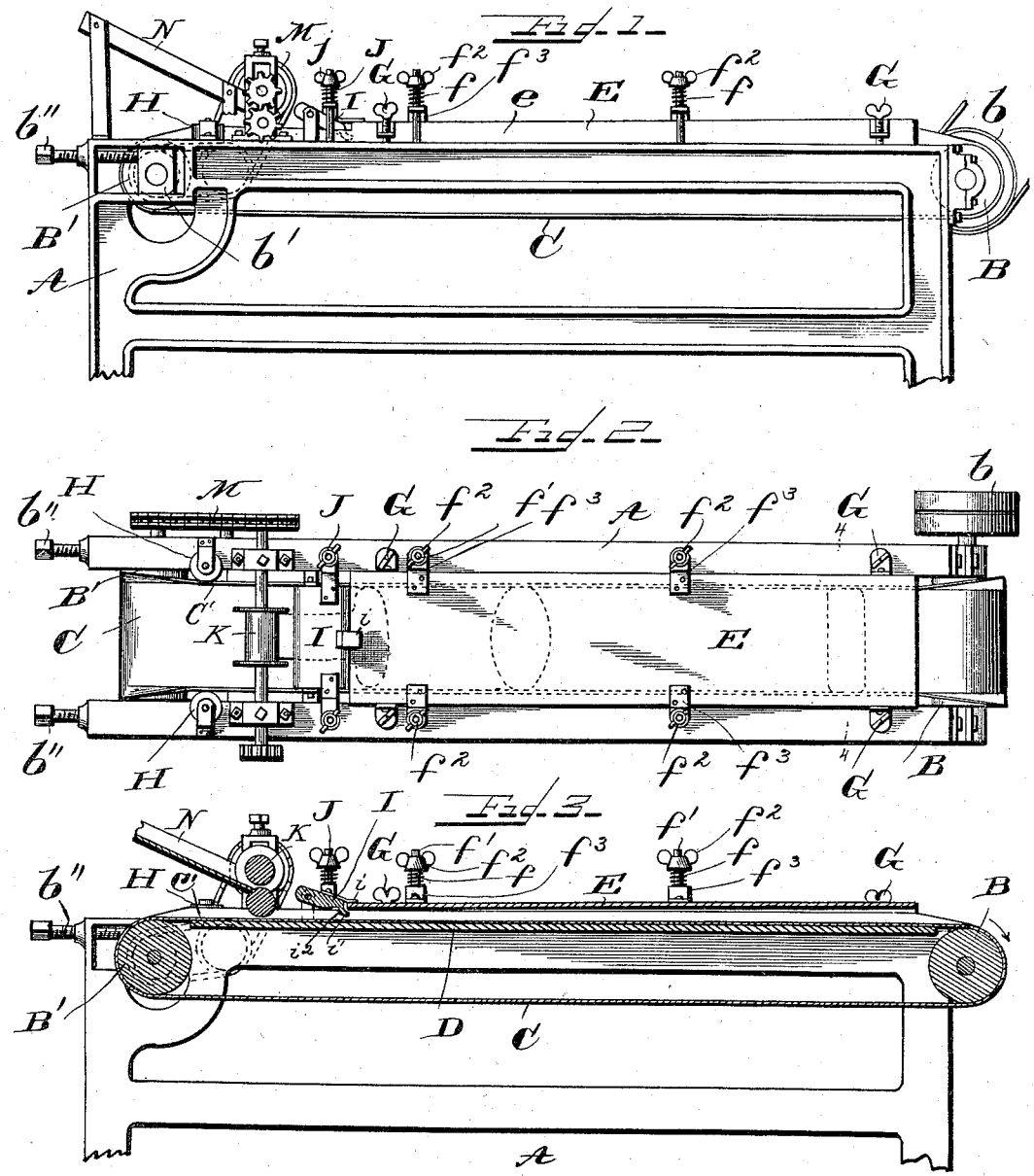

United States Patent Office.

WILLIAM S. CORBY AND CHARLES I. CORBY, OF WASHINGTON, DISTRICT OF COLUMBIA.

MACHINE FOR WORKING AND SHAPING DOUGH.

SPECIFICATION forming part of Letters Patent No. 590,133, dated September 14, 1897.

Application filed April 8, 1897. Serial No. 631,285. (No model.)

*To all whom it may concern:*

Be it known that we, WILLIAM S. CORBY and CHARLES I. CORBY, citizens of the United States, residing at Washington, in the District of Columbia, have invented certain new and useful Improvements in Machines for Working and Shaping Dough, of which the following is a specification.

In the making of bread the dough after acquiring the proper degree of lightness is separated into small masses, which are kneaded and shaped into loaves which are subsequently baked. This kneading and shaping or molding operation is ordinarily done by hand, and is for the purpose of giving to the dough a certain uniform consistency or quality of texture, and at the same time giving to the dough masses such shapes as will produce loaves of the proper shape and appearance.

It is the object of our invention to produce a machine or apparatus by which the dough may be worked or kneaded and shaped in a uniform and rapid and thorough manner, and by which results equal to hand-work may be accomplished; and our invention consists of apparatus or machinery for accomplishing these objects.

In order that our invention may be understood, we have illustrated certain embodiments thereof in the accompanying drawings, in which—

Figure 1 is a side view of one of the preferred forms of our invention. Fig. 2 is a top plan view of the same. Fig. 3 is a central longitudinal section. Fig. 4 is a transverse section taken on the line 4 4 of Fig. 2. Figs. 5, 6, and 7 are detail cross-sectional views illustrating different forms of our invention. Figs. 8, 9, 10, and 11 are detail longitudinal sectional views illustrating different steps in the process of making a loaf of bread by means of our machine. Fig. 12 is a detail sectional view, enlarged, of part of the belt.

In the drawings, A represents the framework of the machine, in which are mounted two rollers B and B', the shaft of one of which is provided with driving-pulleys $b$, which may be connected by belt with any suitable source of power. A relatively broad belt C is mounted upon the rollers and is driven thereby. One of the rollers B' is preferably mounted in movable bearings $b'$, which are adjustable by means of the screws $b''$, so that the tension of the belt may be regulated. We prefer that the belt should be of leather $c$, covered with canvas $c'$, the latter coming in contact with the dough, as we find that canvas is easy to keep clean, the dough does not stick to it, and it possesses a degree of roughness which gives to the belt the proper frictional engagement with the dough. Between the rollers the belt passes over a table or support D, which sustains the belt and keeps it in a uniform level plane while operating upon the dough.

Above the belt there is arranged an opposing surface, which is preferably in the form of a pressure board or plate E, between which and the belt the dough is carried. This pressure-board is preferably removable and provided with depending side flanges $e$, which may rest upon the framework A, as shown in Fig. 4. It is preferably adjustable toward and from the belt, to secure which adjusting-screws G or other forms of stops or adjusting devices may be used. These adjusting-screws are shown as being mounted in brackets carried by the pressure-board and bearing upon the top of the framework.

The pressure or resistance board should be held down or toward the belt with a yielding force, and to secure this any suitable form of spring-pressing device may be used. That which we have illustrated consists of a number of coiled springs $f$, arranged upon posts or pins $f'$ and between adjusting-nuts $f^2$ and brackets or projections $f^3$, carried by the pressure-board. By adjusting the nuts upon the posts $f'$ the tension of the springs may be varied and the pressure exerted upon the board E and through it upon the material, and the resistance which it offers to the forward movement of the material are correspondingly regulated. In practice the best results are accomplished when the pressure is less at the delivery end of the board than at the feed end.

We prefer that the belt, while passing over the table D, should have its edges $C'$ turned up at right angles to the main central portion thereof, and to accomplish this turning-rollers H are arranged at the feed end of the machine on either side of the belt. While the belt is passing under the pressure-board the edges C' are held up by the flanges e of the pressure-board, along the inner sides of which the edges of the belt travel. When the belt is constructed of leather and canvas, as before described, the leather may be cut near the edges of the belt, as indicated at c'', Fig. 12, in order to facilitate turning up the edges C'.

Adjacent to the front edges of the pressure-board E we arrange a yielding-pressure device I, under which the dough must pass before it enters the space between the belt and the board E, and which operates to curl or fold over the advancing end of the mass of dough, and which, from its function, we term the "curler." It preferably consists of a comparatively narrow plate, arranged centrally over the belt and pivotally supported near its rear end in supports I', which hold its end sufficiently high above the belt C to lower the masses of dough which may be fed to the machine to enter freely under the plate.

A spring or springs J tend to force the end of the curler nearest to board E toward the belt, the springs being preferably provided with tension-regulating devices $j$. As it is desirable that the edge of the curler should never come quite into contact with the belt, as that would tend to prevent the feeding of the dough and clog the machine, the curler is provided with a stop $i$ to limit its downward movement, and it is also provided with another stop $i'$ to limit its upward movement, these two stop-pieces being arranged to engage with the board E, as clearly represented in Figs. 3, 8, and 9. The engagement of the curler I with the upper edge of the moving mass of dough operates to retard the movement of the part with which it comes in contact, while the lower portion of the mass which is engaged by the belt moves forward more freely, with the result that the dough is folded, rolled, or curled over at its front or advancing edge. To better secure this result, the under surface of the curler-plate, that with which the dough engages, is provided with a shoulder $i^2$, which is so shaped as to retard the upper part of the dough mass sufficiently to cause it to curl or fold over without, however, stopping the mass, which then enters the space between the belt and the pressure-board with a rolling motion, which is continued as the dough passes through the machine.

The dough may be fed by hand directly to the curler; but we prefer to arrange a pair of feeding-rollers K just in advance of the curler, one of these rollers being provided with flanges which overlap the ends of the other roller for the purpose of shaping the dough into a sheet of uniform thickness and width. These rollers may be driven in any suitable manner. We have shown driving-gearing M between them and the shaft of the roller B'.

A feed chute or board N is shown as leading to the rolls K.

The pressure-board may be variously shaped, according to the kind of bread and style of loaf desired to be produced. In the form of device shown in Figs. 1, 2, 3, and 4 the pressure device has a flat surface opposed to the belt and parallel therewith and of substantially the same width and with depending side flanges, this style of pressure-board being especially adapted for making the kind of bread know as "Vienna" bread.

In Fig. 5 is shown a form of pressure-board in which the inner operating-surface is curved and is only about one-half the width of the belt. This style of pressure device would operate to make the style of loaves known as "home-made."

The style of pressure-board shown in Fig. 6 is designed for making Vienna rolls and that in Fig. 7 for making round rolls or biscuits.

We will now describe the operation of the machine shown in Figs. 1 to 4. After the dough has come to the proper degree of age and lightness for being made into loaves it is weighed out into masses of a uniform size, and these are fed one at a time to the machine. The rolls K operate, as stated, to give to the irregular mass of dough a uniform width and thickness, the sheet as it issues from the rolls being preferably long, narrow, and thin. This sheet of dough passes directly under the curler, the shoulder $i^2$ of which momentarily retards the forward movement of the part of the sheet with which it engages, while the belt continues to carry forward the lower part of the sheet of dough. The forward edge of the dough sheet is thus curled or folded back on itself, and this is accomplished without tearing or breaking the skin of the dough, which is very important. As the dough escapes from the curler into the space between the presser and the belt it begins to roll into a mass and to spread out transversely across the belt, there being three movements imparted to the dough—viz., a slow progressive movement in the direction in which the belt is traveling, a rolling or folding of the dough upon itself on a line transverse to the belt, and a gradual elongating of the loaf as it approaches the rear end of the machine or until it acquires a length equal to the distance between the side edges of the belt. The progress of the dough through the machine results in a working and shaping of it into a loaf in a rapid and cleanly manner and as perfectly as can be done by hand.

In Fig. 2 three masses of dough are represented in dotted lines as being operated upon. The first mass toward the feed end is shown as passing through the rollers K under the presser or curler I and into the space between the belt and pressure-board, where it begins to roll and spread out laterally. Figs. 8 and 9 show in cross-sectional views the dough in about the same position as the first mass of Fig. 3, Fig. 9 showing a slightly more advanced position than Fig. 8. The second or middle dough mass (represented in Figs. 2 and 10) is spread out transversely to about the required extent, but is not comparted and rolled or folded up into the nearly cylindrical shape which it should have as it emerges from the machine and which is represented in Fig. 11 and the third dough mass of Fig. 2.

It should be understood that we have not described every form of apparatus in which our invention may be embodied, only the preferred forms being shown. Many changes in the construction and arrangement of the parts will readily suggest themselves to those familiar with this art and as coming within the scope of our invention, and we wish to be understood that we do not mean to limit our invention to the particular apparatus shown and described. Thus the arrangement of the pressure board or device above the belt is not essential to the invention, but is the best and preferred arrangement. Likewise a stationary pressure-board is preferable to a movable one, such as a traveling belt, but it is not essential to the invention.

Some of the advantages of our invention would be retained in a machine without a curling or pressing device like that shown at I.

By making the traveling belt of a main central portion and two side portions arranged at substantially right angles to the main portion the shape of the loaf being formed is much improved, as the side portions of the belt insure that the ends of the loaf shall be fed along at the same rate as the central part. While we prefer that the belt should be of one piece with its edges turned up to form the side portions C', the same result would be accomplished by the use of a main horizontal belt and two independent vertically-disposed belts arranged at the edges of the main belt and traveling at the same speed. When a compound belt is used formed of two portions c c', as herein described, the foundation may be of leather or equivalent material, such as rubber, and when we use the term "leather" in this case we mean to include by such term both leather and its equivalent.

We have found that the bread which is worked and shaped in a machine made according to our invention is of a more uniform grain or texture and is somewhat lighter in color than is bread which is worked by hand and is therefore superior to hand-made bread in these respects. We account for this from the fact that each loaf or mass of dough receives the same treatment, which insures uniformity and is more thoroughly worked and shaped than when worked by hand.

What we claim, and desire to secure by Letters Patent, is—

1. The combination of a traveling belt an opposing pressure-board provided with depending side flanges which are arranged adjacent to the belt and supports for said board, substantially as set forth.

2. The combination of a traveling belt, an opposing pressure board or device, provided with depending flanges at its sides, and a sustaining-table over which the belt moves, and upon which the side flanges of the pressure device are adapted to rest, substantially as set forth.

3. The combination of a traveling belt, an opposing pressure device, and a plurality of springs which hold the said pressure device toward the belt with a yielding force, and are arranged as described, whereby a greater pressure may be applied near one end of the belt than near the other, substantially as set forth.

4. The combination of a traveling belt, and an opposing spring-pressed pressure device, the pressure being less at the delivery than at the feed end of the device, substantially as set forth.

5. In a machine for working dough, the combination of a traveling belt, an opposing pressure-board, the adjusting devices G, by which the pressure-board may be positively adjusted toward or away from the belt, and the spring pressing devices which hold the board toward the belt with a yielding force, substantially as set forth.

6. The combination of a traveling belt, an opposing pressure device, and a curler at the forward end of the latter, substantially as set forth.

7. The combination of a traveling belt, an opposing surface, and a curler provided with a retarding-shoulder which engages with the material as it is fed between the belt and said opposing surface, substantially as set forth.

8. The combination of the traveling belt, a curler, a pressing device arranged above the belt and in front of the curler, and a spring which holds the curler toward the belt, substantially as set forth.

9. In a bread working and shaping machine, the combination of a traveling belt, an opposing pressure or resistance board, a curler at the front end of the pressure-board, and a pair of dough-shaping rollers in front of the curler, substantially as set forth.

10. The combination of a traveling belt C, devices for turning up the edges of the belt, and for maintaining such edges substantially at right angles to the main central portion thereof, and an opposing pressure-board arranged opposite to and substantially parallel with the central portion of the belt, substantially as set forth.

In witness whereof we hereunto set our hands in the presence of two witnesses.

WM. S. CORBY.
CHARLES I. CORBY.

Witnesses:
J. S. BARKER,
J. E. HUTCHINSON, Jr.